(12) United States Patent
Dofher

(10) Patent No.: US 7,574,092 B2
(45) Date of Patent: Aug. 11, 2009

(54) JUNCTION BOX HOUSINGS FOR SURFACE INLAID FIBRE OPTIC NETWORK INSTALLATIONS

(75) Inventor: Darren Dofher, Port Coquitlam (CA)

(73) Assignee: Teraspan Networks, Inc., Vancouver, British Columbia (CA)

( * ) Notice: Subject to any disclaimer, the term of this patent is extended or adjusted under 35 U.S.C. 154(b) by 365 days.

(21) Appl. No.: 10/564,757

(22) PCT Filed: Jul. 16, 2004

(86) PCT No.: PCT/CA2004/001043

§ 371 (c)(1),
(2), (4) Date: Jan. 13, 2006

(87) PCT Pub. No.: WO2005/008307

PCT Pub. Date: Jan. 27, 2005

(65) Prior Publication Data

US 2006/0147171 A1 Jul. 6, 2006

Related U.S. Application Data

(60) Provisional application No. 60/487,595, filed on Jul. 17, 2003.

(51) Int. Cl.
*G02B 6/00* (2006.01)
(52) U.S. Cl. .................. 385/135; 385/134; 385/137; 385/136; 385/147
(58) Field of Classification Search ................. 385/134, 385/135, 136, 137, 147
See application file for complete search history.

(56) References Cited

U.S. PATENT DOCUMENTS

| 4,958,903 | A | | 9/1990 | Cobb et al. |
| 5,222,183 | A | * | 6/1993 | Daems et al. ............... 385/135 |
| 5,802,237 | A | * | 9/1998 | Pulido ........................ 385/135 |
| 5,911,027 | A | * | 6/1999 | Macken et al. |

(Continued)

FOREIGN PATENT DOCUMENTS

CA 2237324 6/1997

(Continued)

*Primary Examiner*—James P Hughes
(74) *Attorney, Agent, or Firm*—McDermott Will & Emery LLP

(57) ABSTRACT

A system for protecting buried optic fibre nodes which permits surface inlay installation of cable without the need to expose free ends of the cable for threading through any apertures, includes a protective housing (10) composed of spaced apart panels (14,16) which define an interior space. The panels open to expose the interior for installation of a length of cable (50) therein. An insert (30) fits within the space, which includes a channel (38) which is exposed when the panels (14,16) open for insertion of a cable. The insert includes a void (32) to receive a cable junction box (34). A removable protective outer casing may be provided, either in the form of a pair of outer walls with a removable cap or base, or a can-like container having a removable top and two or more opposed slots communicating with the upper rim of the container. The housing fits within the container, with the cable entering and exiting through the slots, which also permit a saw cut to pass through the slots to facilitate installation of the system. The system also includes a pre-assembled cable network including nodes, cable and housings that may be buried within trenches cut into a surface.

8 Claims, 12 Drawing Sheets

U.S. PATENT DOCUMENTS

| | | | |
|---|---|---|---|
| 5,966,492 A * | 10/1999 | Bechamps et al. |
| 6,250,816 B1 * | 6/2001 | Johnston et al. |
| 6,385,381 B1 * | 5/2002 | Janus et al. |
| 6,396,989 B1 * | 5/2002 | Johnston et al. |
| 6,424,782 B1 * | 7/2002 | Ray |
| 6,480,660 B1 | 11/2002 | Reitmeier et al. |
| 6,504,987 B1 * | 1/2003 | Macken et al. |
| 6,668,130 B2 * | 12/2003 | Meyer |
| 6,933,441 B2 * | 8/2005 | Fuller et al. |
| 2003/0095773 A1 * | 5/2003 | Ichinari |
| 2003/0103755 A1 * | 6/2003 | Meyer |
| 2004/0170369 A1 * | 9/2004 | Pons |
| 2004/0175089 A1 * | 9/2004 | Dagley et al. |

FOREIGN PATENT DOCUMENTS

| | | |
|---|---|---|
| DE | 3405309 A1 | 8/1985 |
| DE | 196 23 482 A1 | 12/1997 |
| EP | 0 908 996 A1 | 4/1999 |
| GB | 2 176 907 A | 1/1987 |
| JP | 57195206 | 11/1982 |
| JP | 3102231 | 4/1991 |
| WO | PCT/EP02/06416 | 1/2003 |

* cited by examiner

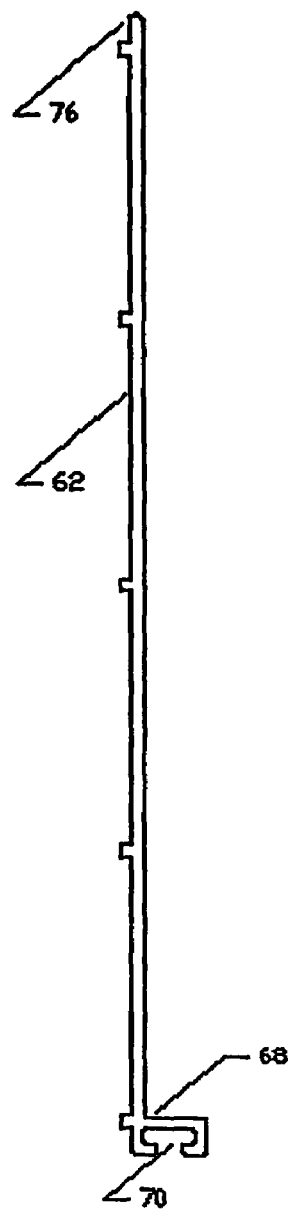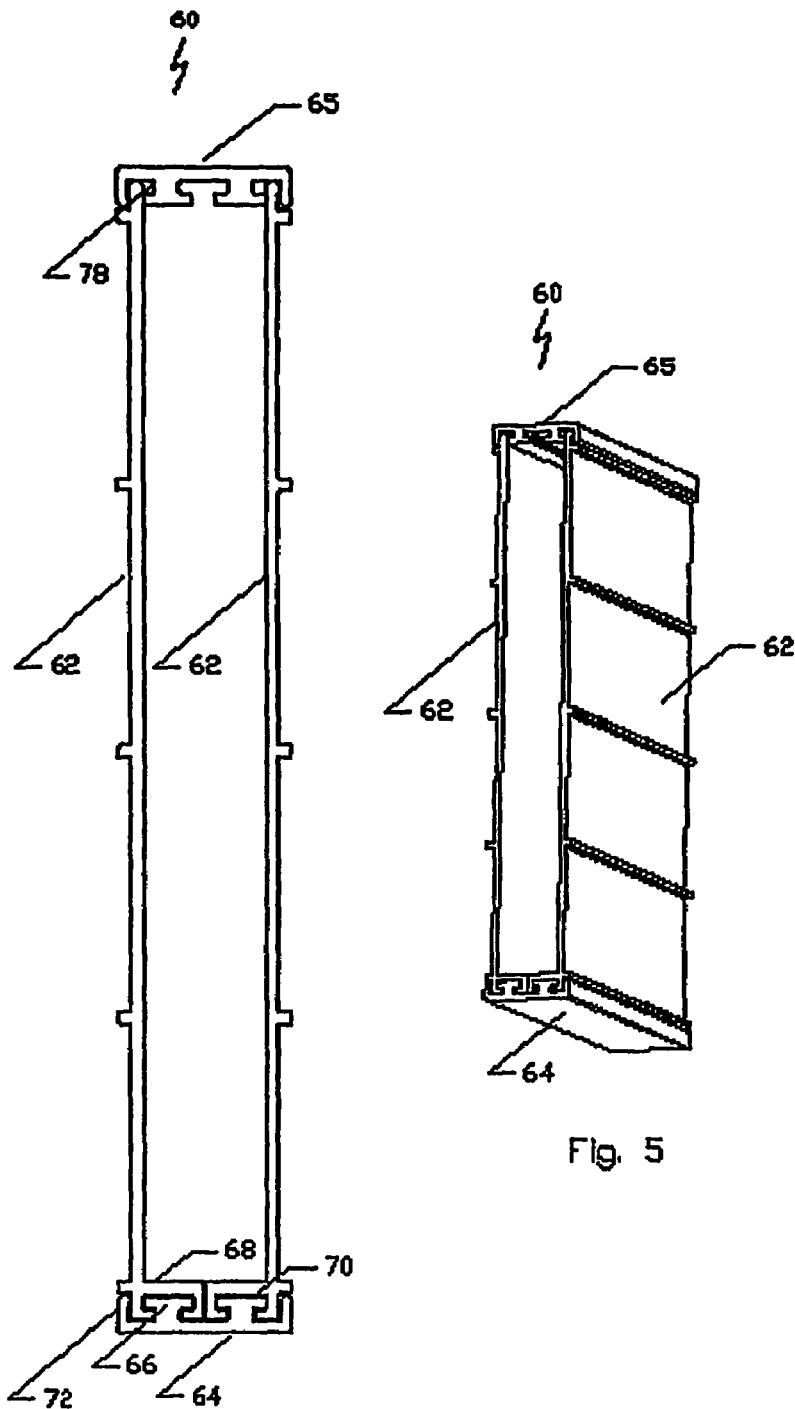
Fig. 7
Fig. 6
Fig. 5

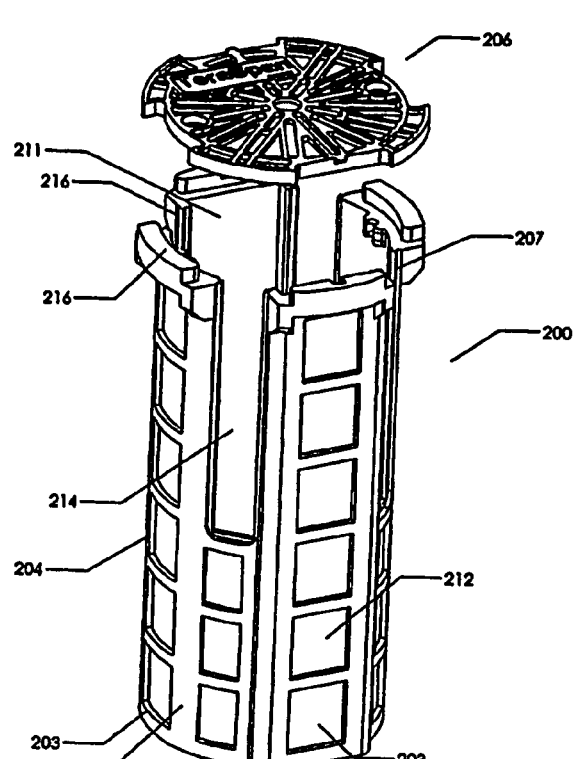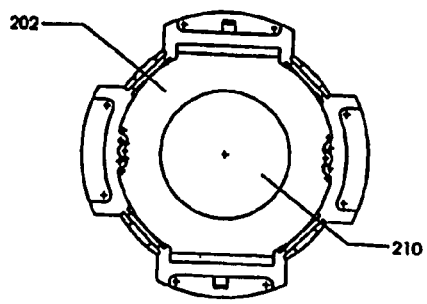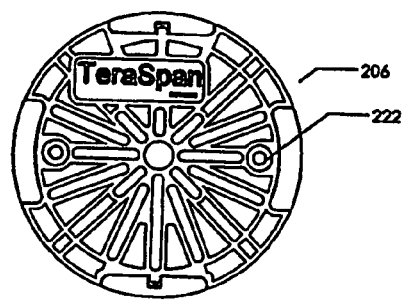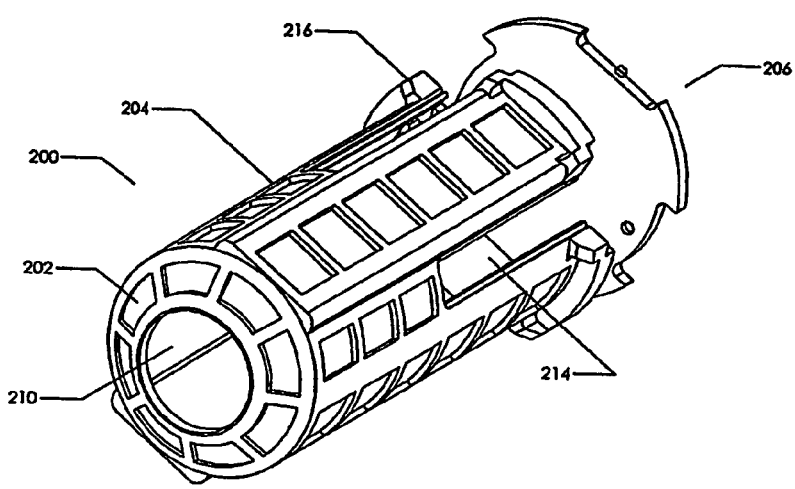
Fig.14
Fig.15
Fig.16
Fig.17

JUNCTION BOX HOUSINGS FOR SURFACE INLAID FIBRE OPTIC NETWORK INSTALLATIONS

This application claims priority from PCT Application No. PCT/CA2004/001043, filed 16 Jul. 2004 (incorporated by reference herein) and U.S. application Ser. No. 60/487,595, filed 17 Jul. 2003 (incorporated by reference herein).

FIELD OF THE INVENTION

The present invention relates to buried fibre optic networks installed within surfaces such as city streets, turf, etc.

BACKGROUND OF THE INVENTION

Optic fibre networks may include multiple "nodes", which may comprise a cable junction, spare cable loops or both. For purposes of this patent specification and claims, a "node" means a portion of a cable network which consists of either a cable junction or one or more cable loops (to supply a length of cable which may be drawn on for future system expansion, repairs or the like) or both of loops and a junction. It is desirable to provide a system that permits an uncut length of cable to be inlaid from the surface without cutting. For such purpose, network components and in particular the components provided at the cable nodes must be adapted for surface inlaid installation without no or minimal need to thread a free end of the cable through any component.

Repairs and future expansion require convenient access to additional lengths of cable, which preferably may be provided by building into the system spare cable loops in order to minimize the requirement of cable splicing as the need arises for additional cable. However, cable loops can be difficult to form and keep in place during and after the system installation, as fibre optic cable is typically relatively stiff and retains a "memory" and thus often defies being formed into tight loops and holding such loops in place during burial. Another requirement in such a system is that the nodes (which may include delicate cable junction equipment) be protected against damage.

It is desirable to provide a convenient means for installing and protecting one or more cable loops and optionally a junction box. Ideally, protection is given against compression or crushing as well as moisture, while permitting quick and simple installation of the loops and/or junction box within a narrow trench. In the present inventor's previous patent application (Published Canadian Application No. 2,337,284), a rigid junction box is disclosed around which additional cable loops may be formed. An optional rigid frame is provided to hold both the junction box and up to several loops of cable. The junction box and optional frame may be burled at a system node. The present invention relates to an improved modular system for holding either cable loops or a junction box, or both, for burial as part of a fibre optic cable network. Preferably, the network is buried within a narrow, slit-like trench which may be cut into either a hard surface such as pavement or a soft surface such as turf.

A cable system installed within a soft surface such as turf is typically set into a trench which may be somewhat wider and deeper in comparison with a hard surface such as asphalt or other pavement; it is easier to dig into a soft surface and a deeper setting of the fibre optic cable is desirable to avoid crushing or distortion when, for example, equipment rolls over the surface.

SUMMARY OF THE INVENTION

An object of the present invention is to provide protective housings to protect fibre optic system components at system nodes which permit surface inlaid cable installation. The node may comprise a cable junction and/or one or more loops of cable. A further object is to provide improved protection for system nodes buried under hard surfaces such as pavement or within a soft surface such as turf.

In one aspect, the invention relates to a module or unit for housing a "node" of a fibre optic network. The module includes an openable housing for retaining and protecting a cable junction box and/or a cable loop. The housing comprises spaced apart panels which define an interior space. The panels open to expose the interior space. An insert fits within the interior space, such as a removable foam insert. The panels open like a book to receive a length of cable between the panels. The panels are rigid or semi-rigid, meaning they have sufficient rigidity to provide resistance against crushing when the housing is buried. The insert includes at least one channel open to its upper surface for receiving one or more cable loops without threading of a free end of the cable, namely by pressing a length of cable into the channel from the exposed surface of the insert. The insert with cable installed in the channel may be then placed within the housing and the combination then buried beneath a surface in a network installation. The insert also includes a receptacle for receiving and retaining a junction box. The channel includes curving or looping regions to retain a cable in a tortuous path within the channel and prevent slippage of the cable by frictionally engaging the cable within the channels. The channel arrangement may include a segment extending generally around the periphery of the insert to hold one or more cable loops. The channel communicates with the exterior of the housing, for example through openings in the end walls of the housing, such that cable may exit and enter the housing from the cable network. Several channels may be provided to provide options for cable placement, depending on the type of junction box used and other system needs.

The housing includes peripheral side walls to space apart the panels. One of said side walls is hinged to a panel such that the panel forms an openable lid for access to the inside of the housing. The housing opens to permit access to the insert, such that an uncut length of cable may be placed within the channel without having to sever the cable and thread a free end of the cable through the housing.

In a further aspect, a rigid outer casing at least partly surrounds the housing for additional crush-resistance, for example for use in installations within a soft surface such as turf. The casing is preferably rectangular in shape with open ends, a pair of side walls, a base and a removable cap, wherein the housing may be inserted into the casing when the cap is temporarily removed, without having to cut the cable.

The invention also relates to a rigid member for independent installation within a surface, at a position above the inner housing to protect the housing from damage. The member is intended to be installed within a narrow groove or channel cut into a hard surface such as pavement. The member may be an inverted elongate channel, and preferably includes at least one emboss protruding outwardly from its sidewall for engagement with the surrounding hard surface.

In a further aspect, the invention relates to a system for installing a cable node and associated cable loop and/or junction box within a cored-out hole made within a surface such that surface cuts for installing the cables may be made after the node protector housing has been installed within the surface. This provides an efficient means to install a cable network, and is of particular value in an urban setting where a premium is placed on being able to quickly carry out roadwork. In this aspect, the system includes an elongate rigid hollow outer casing or node protector having at least two opposed slotted openings into its interior for entry and exit of a cable. The system also preferably includes an inner housing which fits within node protector. The interior of the outer casing snugly receives the inner housing. The inner housing comprises at least two and preferably three flat open-topped receptacles joined together by a flexible web for folding the receptacles together like a book. Each of the receptacles comprises a floor and sidewalls defining an interior space. One of the receptacles includes a space to receive a cable junction box, while a second and optionally a third of the receptacles is arranged to receive at least one loop of cable within said interior space.

The outer node protector preferably includes a removable lid and a base with a drainage opening. The node protector is preferably substantially cylindrical for insertion within a cylindrical hole.

The outer node protector casing comprises a plurality of opposed slots open to its upper rim. The slots serve two functions: they permit cable to be dropped into the interior of the casing though the slots, without requiring the cable to be severed and threaded though an opening, and they also permit use of an installation method in which the node protector is installed before any cable cuts are made in the surface; after the node protector is thus installed, the street cuts are made with a slab saw which passes right through the slots.

In this aspect of the invention, a cable network is installed by initially forming cylindrical holes within the surface for the node protectors at predetermined node locations, followed by installation of the node protectors in such a manner that the opposed slots align with the desired surface cuts. The surface cuts are then made with a cutting tool such as a slab saw. Since the slots of the node protectors align with the cuts, the cutting tool (such as a saw) can pass right through the slots within the node protectors. The cables are then installed, along with any associated cable loops and junction boxes being positioned within the node protectors. The node protectors are then capped and the surface restored. A further feature of this aspect of the invention is that all or essentially all steps of the process are carried out with a "surface inlay" mode such that cable is not required to be severed except at junction boxes but may be dropped into all other components.

In a further aspect, the invention comprises a cable network comprising a pre-assembled array for surface-inlaid installation within a surface. In this aspect, the invention comprises a trunk cable line with a plurality of branch lines branching from the trunk line at intervals. At each junction, a junction box is provided which fits within an inner housing of the type described above. Each branch line may terminate in a cable end connector for connection with a receiving cable at a residence, office or the like. The assembly may be pre-made and pre-tested at a remote location and tested for increased efficiency and system reliability. The installation may then be installed by pre-drilling openings and installing cable node protectors at selected node locations, cutting cable trenches between nodes and towards the cable terminals (e.g. residences, etc.) and installing the pre-made cable network within the network of trenches and channels. Such an installation may be carried out entirely as a surface-inlaid system with no cable cuts or threading of a free end required.

Directional references are employed throughout the present specification and claims. Such directional references are not intended to limit the scope of the invention but are merely for convenience of description. In general, terms such as "upper" and "lower" are used in reference to the devices described herein in their normal installed position, i.e., in a generally vertically oriented position. References to "left" and "right" are also selected for convenience of description as the invention is not limited in this respect, as also with terms such as "wall", "floor", etc. It will also be seen that the invention may be installed horizontally, for example if the cable network includes a portion set into a wall or other vertical surface.

BRIEF DESCRIPTION OF THE DRAWINGS

FIG. 5 is a perspective view of an outer housing, particularly intended for use in soft surfaces, according to the present invention.

FIG. 6 is an end elevational view of the outer housing of FIG. 5.

FIG. 7 is an end elevational view of a side wall portion of the outer housing of FIG. 5.

FIG. 14 is a perspective, exploded view of a casing according to the embodiment of FIG. 12.

FIG. 15 is a plan view of the casing base of the above embodiment.

FIG. 16 is a plan view from above of the casing of the above embodiment, showing the removable cap in place.

FIG. 17 is a perspective view of the outer casing of the above embodiment of FIG. 12, showing the cap somewhat displaced from the casing.

DETAILED DESCRIPTION OF EMBODIMENTS

Figure 1:
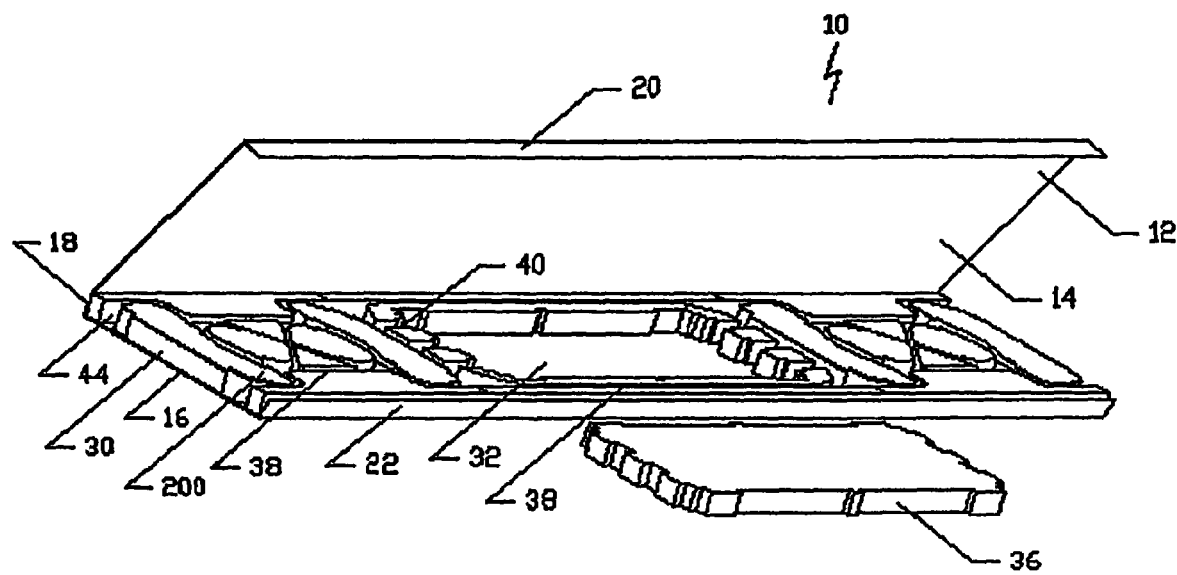
FIG. 1 is a perspective view of a protective inner housing according to the present invention, in the open position.
Figure 2:
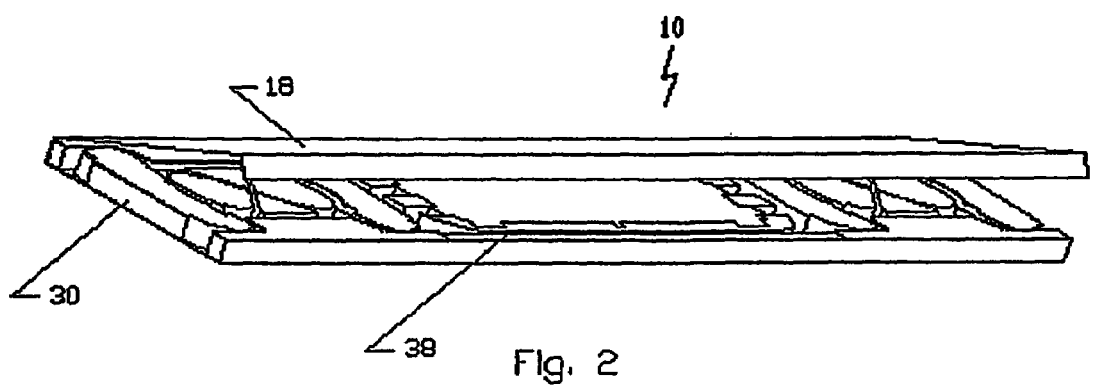
FIG. 2 is a perspective view, as in FIG. 1, showing the inner housing cover in a partially closed position.

A first embodiment of the protective inner housing 10 is shown at FIGS. 1 through 4. For ease of reference and illustration, FIGS. 1 and 2 illustrate the housing 10 in a horizontal orientation in use, the housing would usually be positioned in a vertical orientation for fitting within a narrow vertical slot within a hard surface. However, it is also contemplated that the housing 10 may be installed in the horizontal orientation of FIGS. 1 and 2, for example, if the installation slot is cut horizontally into a wall. The housing 10 includes an exterior shell or casing 12 made from a rigid or semi-rigid plastic sheet material comprising either a flat sheet or a sheet which is corrugated or ribbed for added strength. The sheet material is bent, formed or otherwise fabricated into the desired open-ended box-like configuration. The shell is defined, when closed, by four walls and open opposed ends 21. The walls consist of upper and lower flat panels 14, 16, spaced apart by a narrow rear sidewall 18. The panels 14, 16 each terminate along their edges in overlapping closure flaps 20, 22 which when closed form the fourth wall, namely a front sidewall opposed to the rear sidewall 18. The description provided herein is generally in reference to the housing in the horizontal position of FIG. 1. The flaps 20, 22 may be held together simply by burial of the housing within a trench. However, if desired a closure or fastener of any convenient type such as Velcro™, snaps or a tongue and slot arrangement may be provided on the overlapping flaps to hold them together.

A removable foam insert 30 is provided, which substantially fills the interior of the shell 12. The insert 30 preferably comprises an open or closed cell foam such as pvc, polyethylene, polyurethane, with a closed cell foam being preferable due to its generally greater rigidity and crush resistance and its ability to displace water.

Figure 3A:
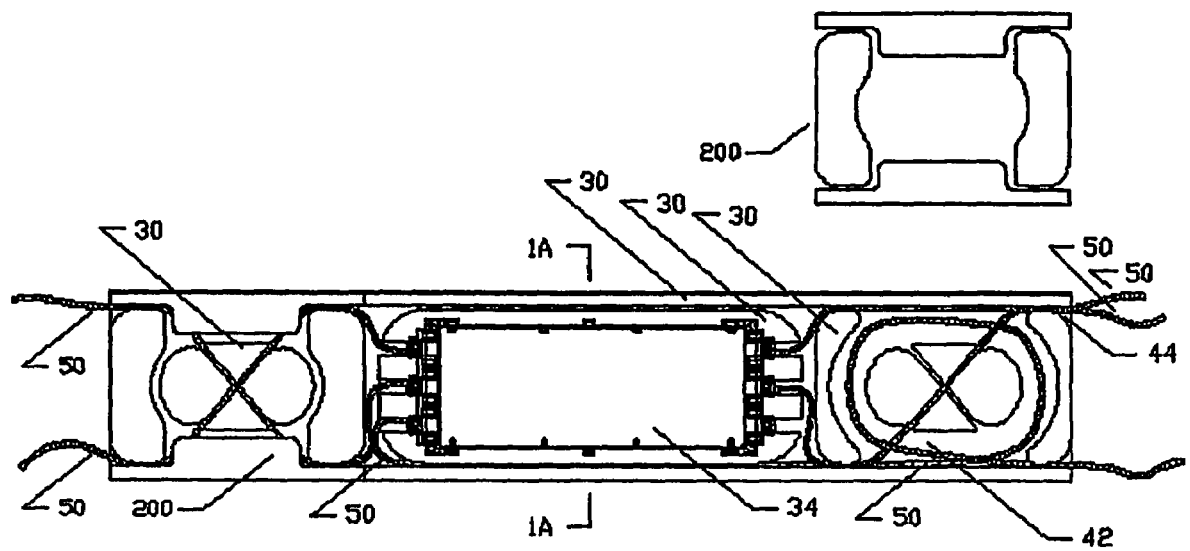
FIG. 3(a) is a plan view of the inner housing, with the cover removed for clarity to show a cable junction box and cable installed within the housing.
Figure 3B:
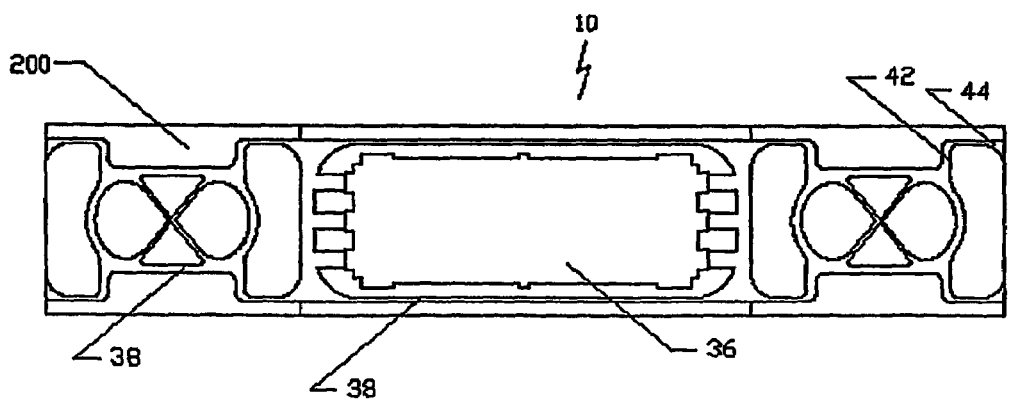
FIG. 3(b) is a view as in FIG. 3(a), showing a removable foam core in position within the housing, and without cable or junction box installed therein.
Figure 4:
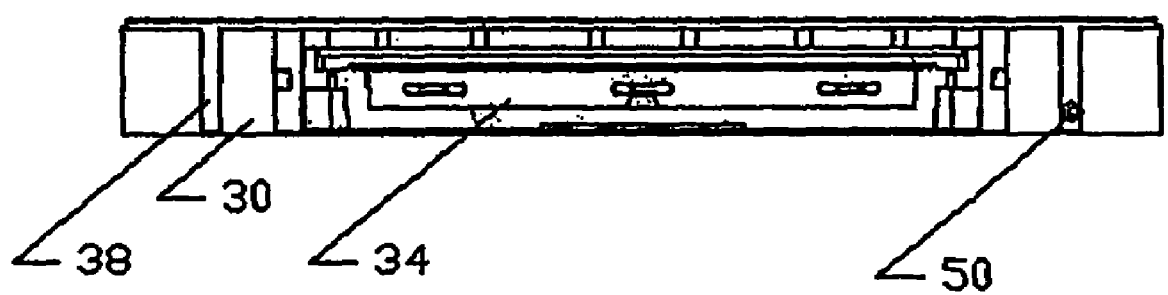
FIG. 4 is a sectional view taken along line 1A of FIG. 3(a), with the cover in the closed position.

A central void 32 within the foam insert 30 provides a receptacle to receive a junction box 34, as seen in FIG. 3(a). The central void 32 has a size and shape to provide a snug fit for a selected junction box 34 which is positioned within the void during installation. As seen in FIG. 3(b) a removable foam core 36 is provided, which fits within the void 32 and which may be left in place if a junction box is not installed within the housing or removed for installation of a junction box 34, as seen in FIG. 3(a). The foam insert 30 includes an array of interconnecting channels 37, for receiving optical fibre cable 29, as seen in FIG. 3(a). A generally rectangular central looping channel 38 surrounds the void 32 to receive one or more loops of cable 50, which may be used for future system expansion. The number of loops which may be received within this channel 38 will vary depending on the depth of the channel (in turn depending on the thickness of the foam insert) and the channel width. Preferably the channel 38 has sufficient depth and width to receive between 1 and about 10 cable loops, although it is also contemplated that additional loops may be retained. The foam insert 30 also includes channels 40 on either side of the central loop 38, for retaining one or more cables 50 in various positions leading to the inlets and outlets of the junction box 34. Entrance and exit channels 42 are provided in the foam core adjacent either end of the housing in communication with the exterior of the housing to receive incoming cable at either end of housing, as seen in FIGS. 3(a) and 3(b). The channels 40 and 42 communicate with the central looping channel 38 and the central void 32 whereby cable 29 may be arranged in any number of possible configurations around the loop 38 and within the channels 40, while optionally communicating with a junction box 34 installed within the void 32. Channels 42 taper outwardly at their mouths to accommodate cables entering the housing at a range of angles. The channels 40 include a region for retaining the cable in a tortuous path between the exterior of the housing and the centrally-disposed junction box 34. This tortuous path is useful for reducing slippage of cable, when tension is applied. Cable slippage is reduced by ensuring a reasonably snug fit of the cable within the channels 42, optionally assisted by selecting a foam material for the insert 30 having a reasonably high co-efficient of friction with a conventional (or selected) cable sheath. There exists any number of possible tortuous paths which the channels 37, 40 and 42 may take in order to firmly hold the cable 29 within the housing 10 without slippage. In the example illustrated herein, the channels 42 include an intersecting x-shaped region surrounded by a small loop requiring the cable 29 to follow a generally zigzag path. It will be seen that essentially any arrangement of channels which permits the user to insert cable in a sufficiently tortuous path will serve the desired function, and the channel arrangement described and illustrated herein is presented merely by way of a non-limiting example.

Figure 8:
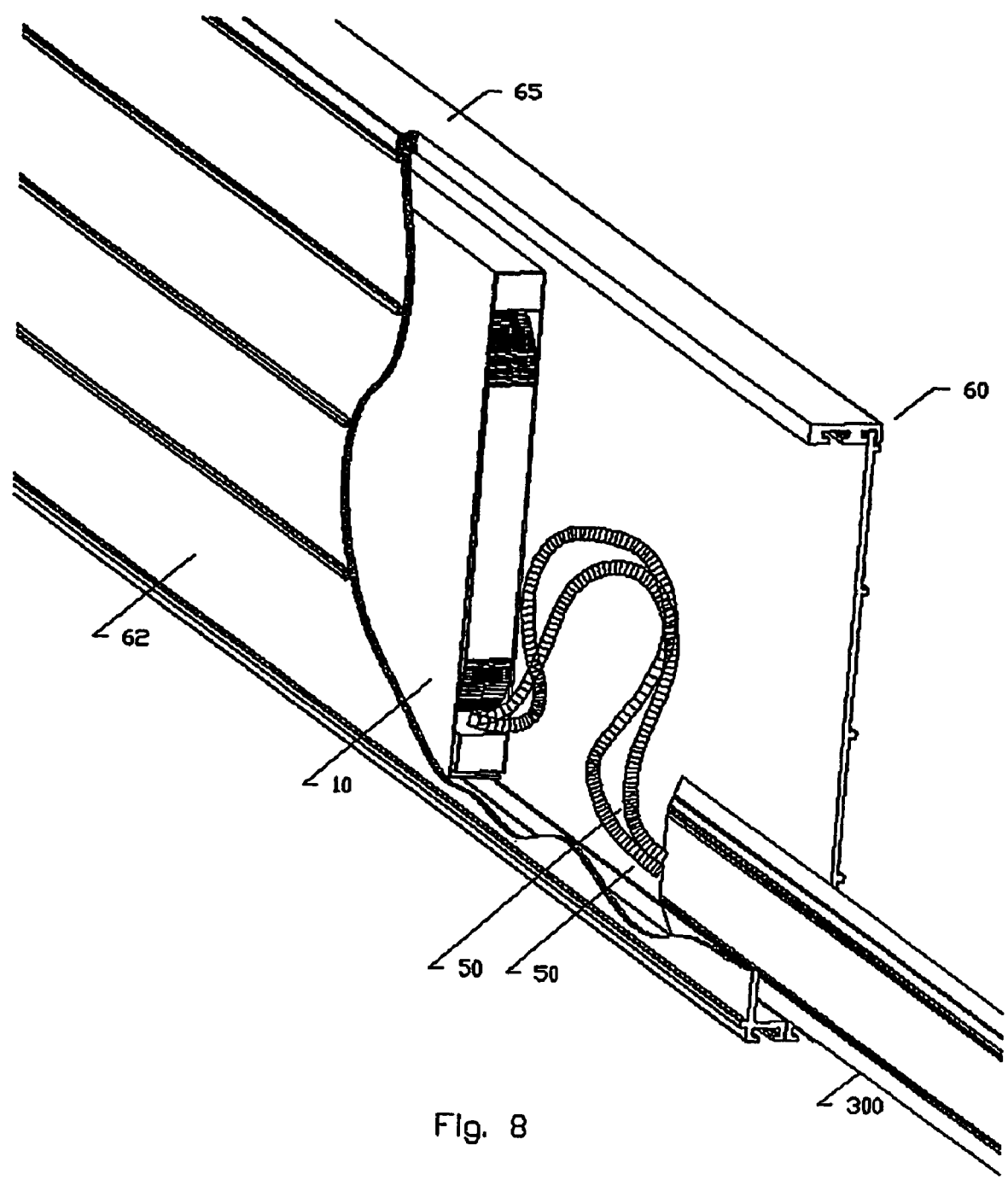
FIG. 8 is a perspective view of the outer housing with a section cut away to reveal the inside elements in their installed positions.

Turning to FIGS. 5 through 7, an outer casing 60 is illustrated, intended to surround and protect the housing 10, particularly for installation within a soft surface such as turf. The casing 60 of FIGS. 5 through 7 comprises an elongate open-ended rigid structure consisting of opposed side panels 62, a base 64 and cap 65. The base 64 comprises an extruded elongate structure having a pair of spaced apart rails 66 extending the length of the base 63. Each side panel 62 includes an inwardly-facing foot 68, having a channel 70 recessed in its lower surface. The panels 62 may be assembled to the base 64 by sliding the panel 62 onto the rail 66 extending upwardly from the base, with the channel 70 and rail 66 mating in a tight fit. The base 64 further includes upwardly extending low side walls 72 along the opposed elongate sides thereof which overlap the side panels 62 to provide additional support and water resistance. The upper edges of the side panels 62 each include an upwardly facing bulbous extension 76 to receive the cap 65. The cap 65 includes a downwardly-facing channel 78 adjacent each elongate side thereof, with the extension 76 and channel 78 interlocking with each other. The cap 65 and base 64 may comprise identical members, oriented in opposing face to face direction. A tight fit between the extension 76 and channel 78 ensures that the cap 65 will not inadvertently be released, and enhances the water resistance of the junction. The dimensions of the casing 60 permits the housing 10 to fit snugly into its interior space defined by the sidewalls, base and cap, as seen in FIG. 8. A cable protector 300 may also be positioned within the casing 60 to shield the cable 50. The protector 300 has been described in the present inventor's co-pending Canadian Application No. 2,337,284, incorporated herein by reference. The protector 300 extends partway into the casing 60 and protrudes out from an open end thereof.

In use, the preferred installation procedure for the casing 60 comprises forming a channel within a soft surface, laying a suitable length of cable 50 within the channel and preferably then enclosing the cable within a cable protector 300. The housing 10 is then installed in a position to surround a portion of the cable 50. This cable region may be formed into a loop and optionally, if two or more separate cables are joined at this location, a junction box 34 is then installed at this location which is then enclosed within the inner housing 10. Optionally the flaps 20, 22 of the housing 10 are fastened together; followed by assembling the casing 60 around the housing 10, i.e., by initially assembling the side panels 62 to the base 64, sliding the casing 10 into the open interior of the casing 60 from the open upper end of the casing 60, followed by assembling the cap 65 onto the casing 60. The casing 60, with the housing 10 enclosed therein, is then buried within the open channel, which is then filled with soil to restore the surface.

Figure 9:
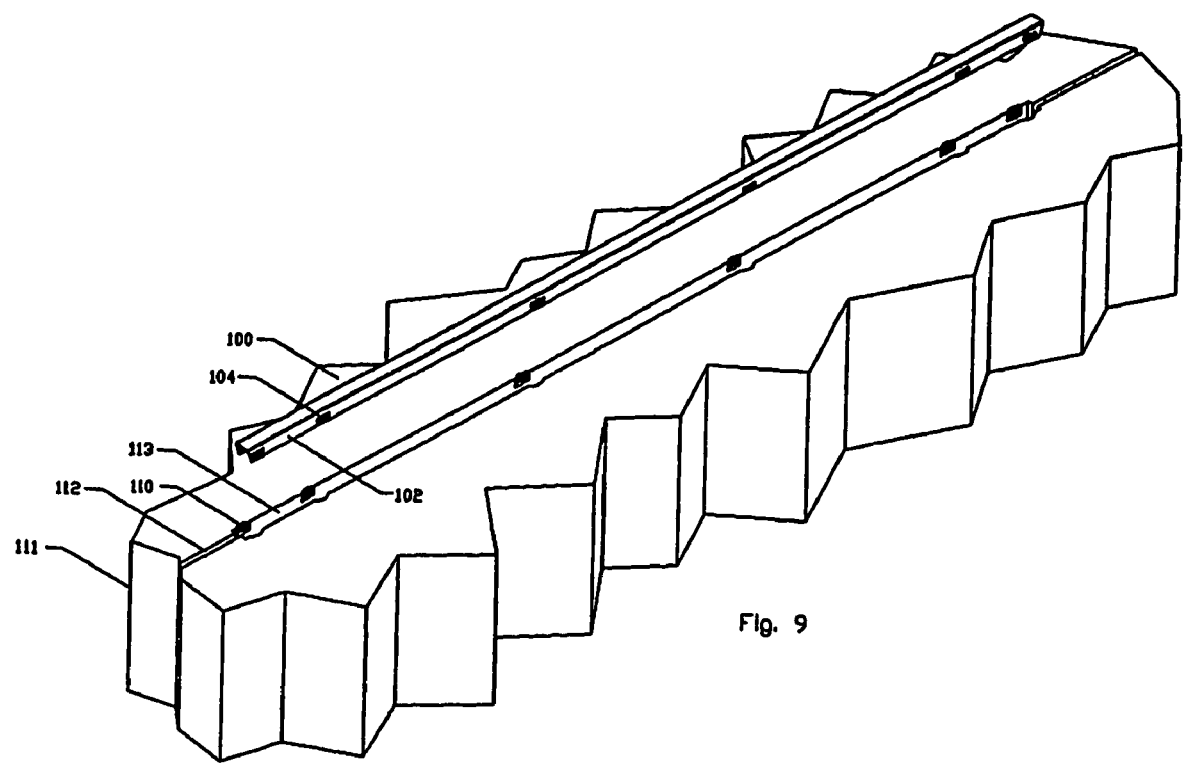
FIG. 9 is a perspective view of a protective cap according to the present invention, prior to installation within a hard surface such as asphalt, with the cut away section of asphalt shown below the cap.
Figure 10:
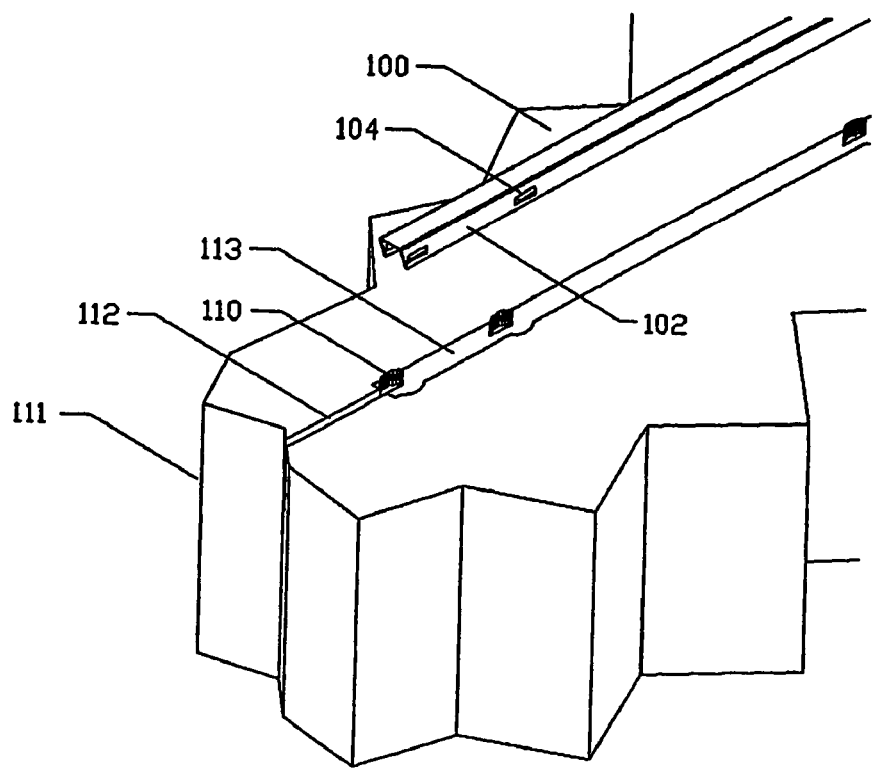
FIG. 10 is a further perspective view of an end region of the cap as shown in FIG. 9.
Figure 11:
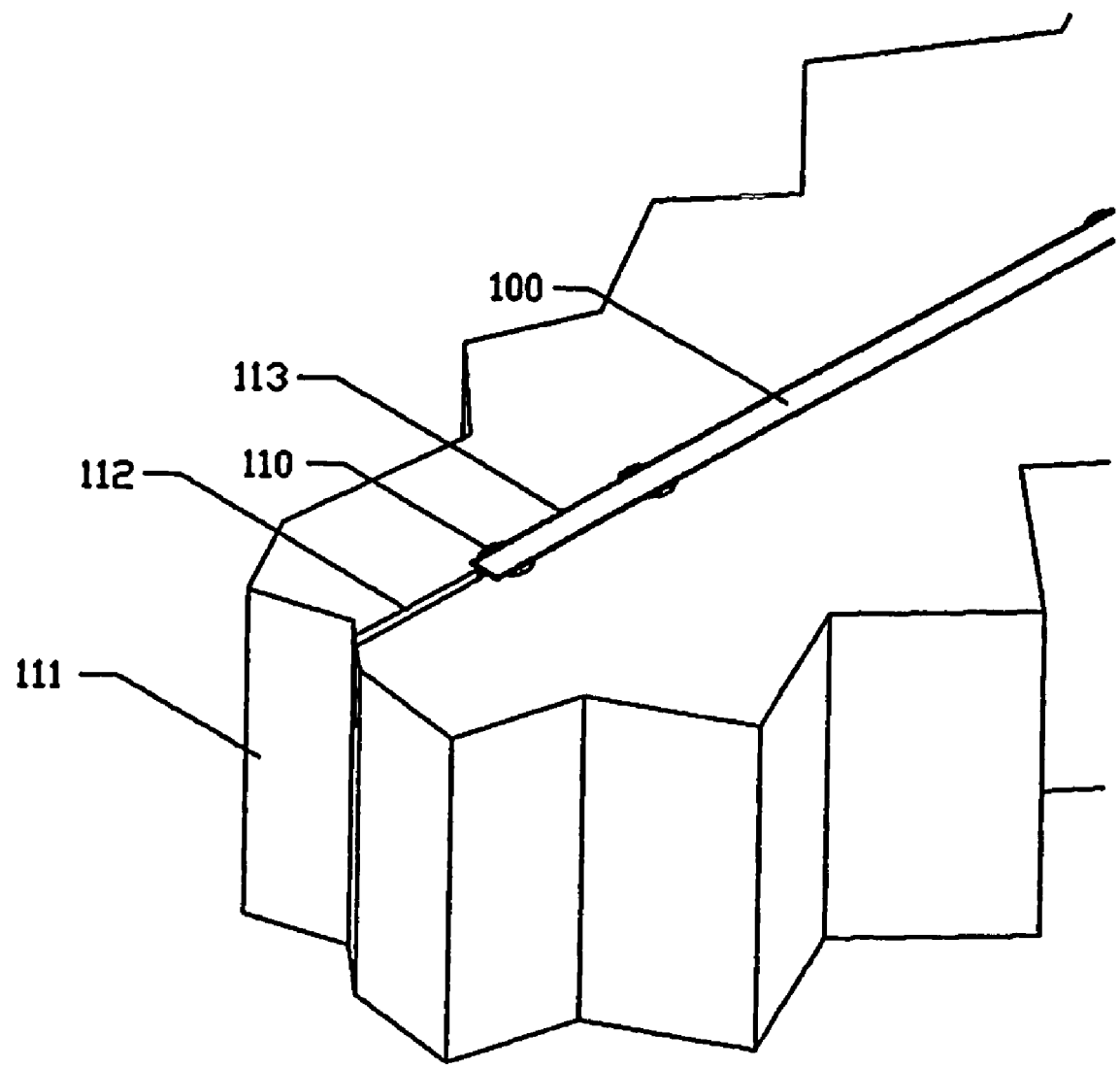
FIG. 11 is a further perspective view of the end of the protective cap installed into the hard surface such as asphalt.

A further aspect of the invention comprises a protective cap 100, illustrated in FIGS. 9 to 11. The cap 100 primarily serves to protect the housing 10 when the housing 10 is installed within a channel in the absence of the casing 60. For example, when the housing 10 is installed within cut 113 within a pavement surface 111, the protective cap 100 protects against crushing of the housing when a heavy vehicle passes over the restored pavement surface. FIGS. 9 and 10 illustrate a primary pavecut 112 for receiving a length of cable 50 and a widened node cut 113 for receiving a junction box and associated housing 10. The cap 100 comprises an elongate channel-shaped member, comprising a rigid material such as stainless steel. When installed, the channel generally opens downwardly to receive the housing 10. The cap 100 may be fabricated by forming a sheet of steel by bending into the appropriate configuration. The inside channel provides a snug fit within its interior for the housing 10. By way of a non-limiting example, the cap 100 may have an inside width of between 12 and 25 mm, for example about 17 mm inside diameter, for fitting over a housing 10 of about the same width. The channel is defined by opposed vertical walls 102. By way of a non-limiting example, the wall height may be between 10 and 33 mm, with a preferred height being about 17 mm. It will however be understood that such dimensions represent merely a convenient embodiment; the cap 100 may comprise any suitable dimensions. The cap 100 includes protruding lateral tabs 104 tabs extending laterally outwardly from the exterior surface of the walls, for supporting the cap 100 when installed within a hard surface such as pavement. The tabs 104, or embosses, are preferably provided on both walls, extending laterally outwardly therefrom, adjacent opposing ends of the cap 100. Additional embosses 104 may be provided for additional support, in particular if the cap is lengthy.

The cap may be installed within a hard surface by the following means. Following installation of the protective housing 10 within a substantially vertical-walled channel cut into a surface, indents 110 are cut into the surface to receive the embosses 104. This may be performed by locating the positions where the embosses 104 will contact the pavement surface (for example, by contacting the pavement with the cap 100 and noting the positions of the embosses 104). A coring bit is then used to cut indents 110 within the hard surface, to a selected depth, to receive and support the embosses 104. The depth of the cuts made by the coring bit will determine the installed depth of the cap 100. The cap 100 may either partly cover the inner housing 10 or be entirely spaced above the housing 10. If desired, the upper surface of the cap 100 may be substantially flush with the pavement surface, thereby providing a convenient means to locate and obtain access to the protective housing 10 and the accompanying cable node. Alternatively, the cap 100 may be recessed below the pavement surface, thereby providing space, including being sufficiently recessed to permit resurfacing of the pavement, to restore the pavement surface.

Subsequent locating of the cap 100, and the underlying node, may be easily accomplished if the cap comprises a ferrous substance or other metal which may be detected by a metal detector.

A further aspect of the invention is illustrated at FIGS. 12 through 19. This aspect comprises a casing for a cable junction suitable for installation within a circular hole 224 cut into a surface. Preferably the hole is generally vertical and for convenience of description a vertical orientation is presently described, although it will be seen that any orientation will be accommodated depending on the disposition of the surface. As well, although the hole 224 and associated casing 200 are described as being circular, this being an easy configuration to form, any suitable cross sectional configuration of hole and casing will suffice.

The casing system comprises a node protector, comprising an elongate rigid outer casing 200, which receives within an interior space a removable inner housing 230. The outer casing 200 has a substantially cylindrical shape, although it will be seen that the selection of a cylindrical shape is essentially arbitrary and is intended for convenience of fitting within a circular hole cored into pavement or other surface. The outer casing 200, seen particularly at FIGS. 14 through 17, comprises a cast steel enclosure having a base 202, sidewall 204 and removable cap 206. The base 202 has an opening 210 therein to serve as a drain hole. The sidewall 204 has a generally curved outer surface 209 and a flat inner surface 211 for snugly retaining an inner housing 230 within the casing interior, as will be described below. When assembled, the inner surfaces 211 of the casing 200 form four opposing flat surfaces for snugly retaining an inner cable housing 230, described below. The base 202 and sidewall 204 are fabricated or cast as a single piece or alternative the base is retained to the panels 203 with mechanical fastening means. The sidewall 204 includes recessed regions 212 for weight reduction. The sidewall 204 also includes four vertical open-topped slots 214 for access into the interior of the casing 200, as will be described in greater detail below. The slots 214 are equispaced around the casing wall 204 and extend from and open to the upper rim 216 of the casing to partway down the casing wall. An even number of slots 214 is provided in opposed relationship such that each slot 214 directly opposes another slot 214 such that a saw may pass through opposed slots while traveling in a straight line. The removable cap 206 and upper rim 216 of the casing body include mating lobes 218, 220 to provide a relatively tight fit of the cap 206 onto the casing body. The cap 206 may be retained to the casing body by any convenient fastening means such as screws 222.

It will be seen that although the outer casing 200 is fabricated from cast iron in the embodiment described herein, any convenient rigid and strong material may be used including a suitable plastic which may be molded into the same or similar configuration. The casing 200 may also be fabricated from sheet metal.

Figure 12:
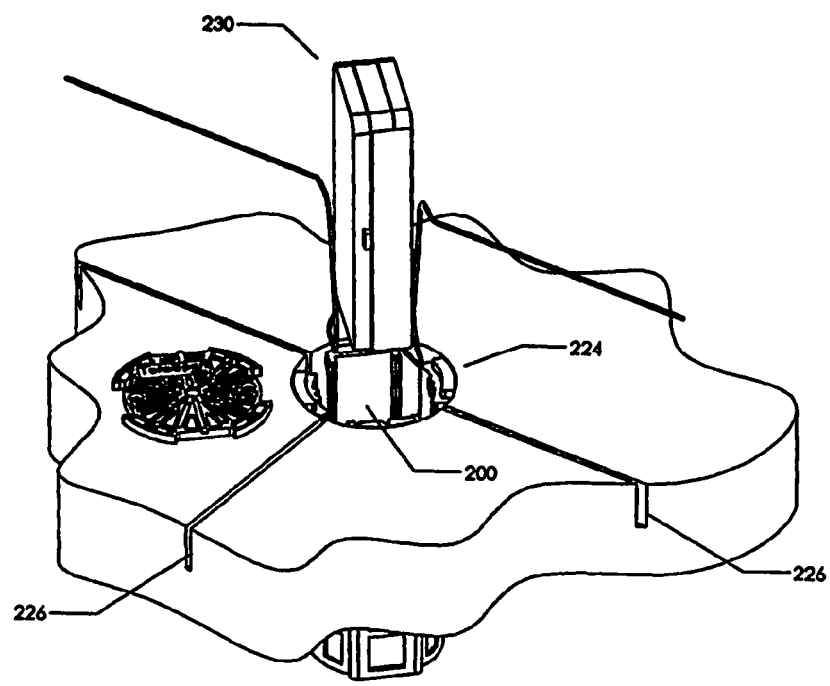
FIG. 12 is a perspective view of a casing according to a further embodiment of the invention, being installed within a pavement surface.
Figure 13:
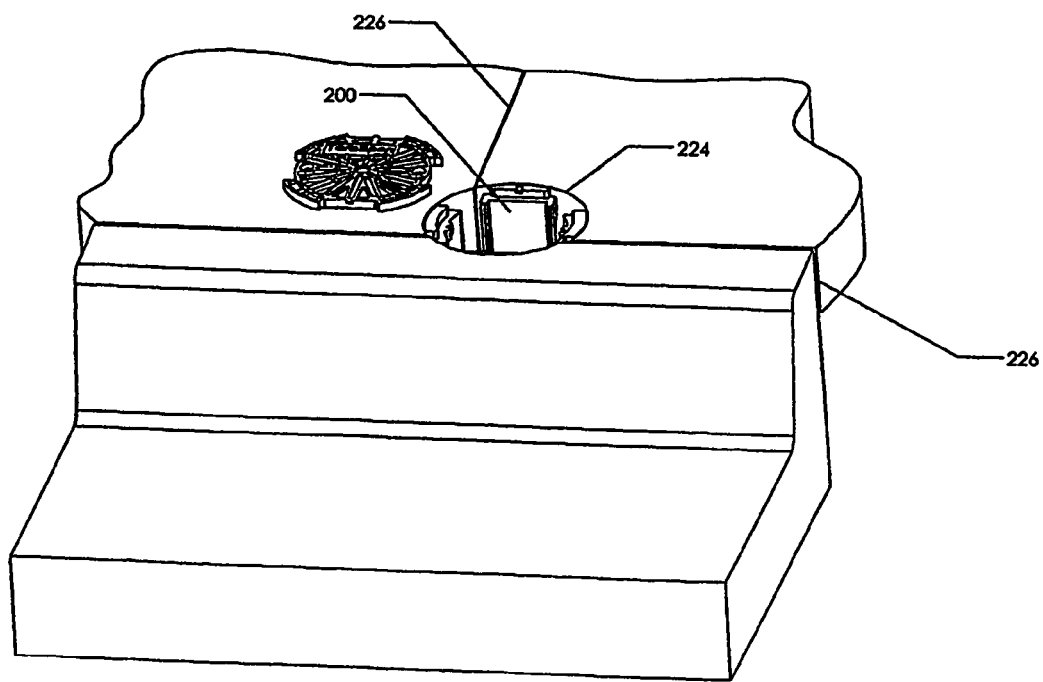
FIG. 13 is a further perspective view of the embodiment of FIG. 12, showing a similar installation at a sidewalk curb.
Figure 18:
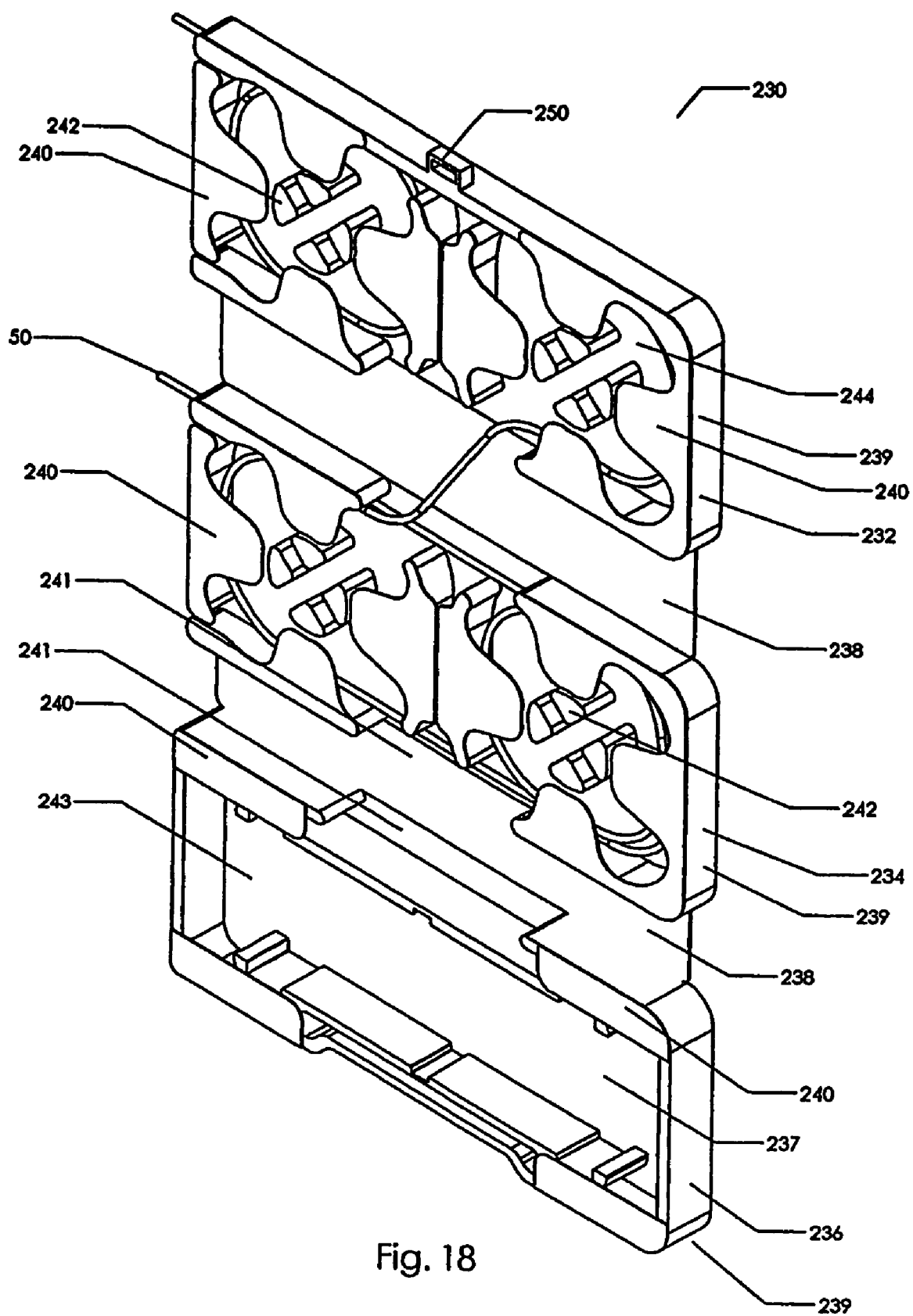
FIG. 18 is a perspective view showing an inner housing in the open position, according to a further embodiment of the invention.

The outer casing 200 may be installed within a circular hole 224 cut into a surface, as shown in FIGS. 12 and 13. Typically, this hole will be cored out at the point of intersection between two or more cable channels or trenches 226 which are preferably cut into the surface after the casing 200 is installed. Thus, the cap 206 is removed and the channels 226 are then cut by a slab saw or other cutting tool which is also driven directly through the slots 214 such that the saw enters a first slot and exits the slot directly opposed thereto, following which a length of cable is dropped into the resulting continuous channel. It will be seen that the casing 200 may be installed at any convenient node point of the network which need not represent a point of intersection. As well, the channels 226 may be cut prior to installation of the casing 200. The embodiment described herein is intended for use at the point of intersection between two such channels 226 which are disposed at generally right angles to each other, although it may equally well be used at a node which is along a single cable and not at a point of intersection. For the purpose of providing a 2-way intersection, the outer casing 200 includes four equi-spaced slots 214 as described above. However, it will be seen that the casing 200 may be adapted for installation at the points of intersection of more than two channels, or channels which meet at other than right angles, by providing a corresponding number and location of the slots within the outer casing.

Figure 19:
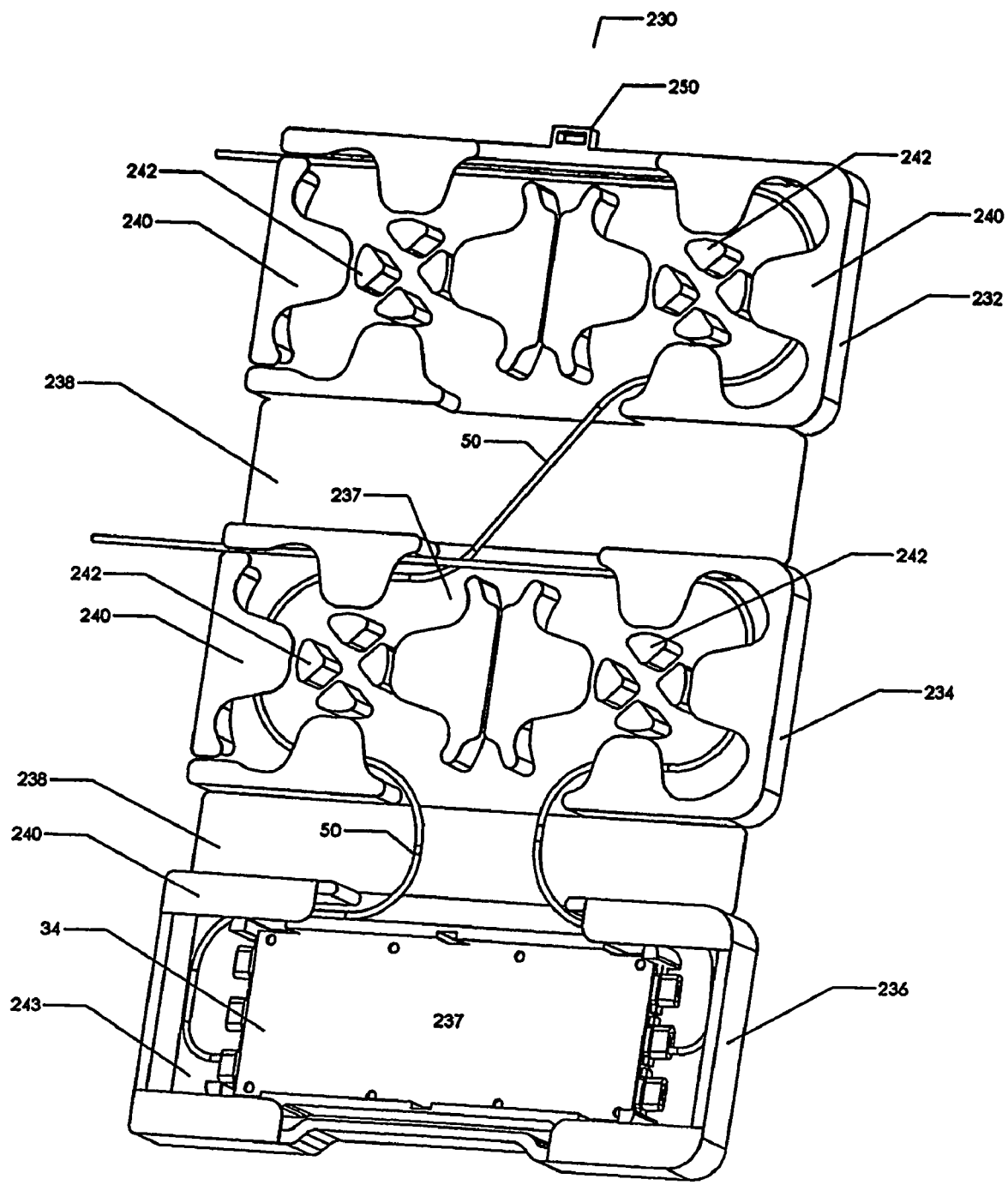
FIG. 19 is a further perspective view of the inner housing according to the embodiment of FIG. 18.

The inner housing 230 (seen in more detail in FIGS. 18-19) is shaped for fitting snugly between the flat inner surfaces 211 of the outer casing 200. The inner housing 230 is more particularly illustrated at FIGS. 18 and 19. The inner housing 230 is generally rectangular and is comprised of three generally flat open-topped shallow receptacles 232, 234 and 236 which fold together in a book-like manner to form a rectangular box-like structure in which the open tops of the receptacles are covered. Each receptacle is itself generally box-like, comprising a flat floor 237, a sidewall 239 extending substantially around the perimeter of the floor and an open or substantially open top. The floor 237 and sidewalls 239 define an open interior space for receiving fibre optic cable and related components as will be described below. The first, second and third receptacles 232, 234 and 236 are joined together by flexible webs 238, which when folded together form opposing spines of the case 230, which may be then inserted within the outer casing in the folded position. The first and second receptacles 232, 234 are essentially identical and each includes hubs 242 for taking up cable slack. The third receptacle 236 includes a void 243 for receiving a cable junction box 34. The junction box is illustrated in FIG. 19. It will be seen that any junction box of a suitable generally rectangular shape will suffice, provided it is the correct size to fit snugly within the void 243.

The receptacle sidewalls 239 include gaps 241 for communication of cable between the receptacles, such that a single length of cable may pass without cutting or splicing between all three receptacles. The gaps 241 face each other across the webs 238 such that when the inner housing is closed the gaps are fully covered by the flexible webs 238. The sidewalls 239 of at least one of the receptacles also include slots 243 to permit cable to enter and exit the interior of the housing 230. The slots 243 open to the upper surface of the sidewalls 239 such that a length of cable may be installed within the inside of the housing 230 when open without having to cut and thread the cable through any openings. The exposed upper edges of the sidewalls 239 include an array of inwardly-facing flaps 240 which partly cover the open tops of the first and second receptacles 232 and 234. The flaps 240 are for retaining cable 50 within the interior of each panel section. The flaps may be aligned on the respective panels and include a smooth exposed surface, such that when the inner housing 230 is in the closed position, the aligned flaps contact each other. The flaps 240 only partially cover the corresponding receptacles to permit access to the receptacle interior for manipulating the cable within the interior thereof. The flaps 240 leave the slots 243 exposed. As well, the exposed upper surfaces of the sidewalls contact each other where not capped by the flaps 240.

A pair of hubs 242 is mounted to the floor of each of the first and second receptacles 232, 234. Each hub 242 includes transecting slots 244 to receive a fibre optic cable 50 therein, such that cable 50 may be wound about one or both of the hubs 242 within each receptacle to take up cable slack and reduce cable slippage. Cable entry and exit ports 250, 252 within the panel sidewalls permit cable to enter the interior of the panel. It will be seen that an uncut length of cable 50 may be installed within the interior of the component without requiring cutting of the cable and threading it through the component. Rather, the cable 50 may be installed at any point along the cable length.

In use, the node protector 200 is installed within a pre-cut opening within a surface as described above at a system node position such that the upper rim of the node protector. Is adjacent to the surface—preferably being slightly below the surface but also potentially at or slightly above the surface. Cable channels 226 are cut into the surface in communication with the interior of the node protector 200. Cable 50 is then laid into the channel or channels, in the process of which cable is dropped into the node protector 200. If the node consists of a cable junction, a junction box 34 is provided, and all necessary cable junctions or splices are formed in association with the junction box. The junction box 34, with cables 50 extending outwardly, is then placed in the void 245 of the third receptacle 236. If an excess length of cable is provided, this excess may be wound about one or more of the hubs 242. The three receptacles 232-236 of the inner housing 230 are then folded together like a book to form a rectangular member containing the cable junction box 34 and optionally a length of spooled cable 50, with the housing 230. The housing 230 may be provided with a clasp 250 to hold the retainer components 232-236 tightly together. The inner housing 230 is then inserted within the outer casing 200 such that the flat sides of the casing interior contact the corresponding flat sides of the closed housing 230 for a snug fit. The cap 206 is then replaced and after the cables are repositioned within the channel or channels 226 the surface is restored. Preferably, the node protector has been sunk into the surface at a depth sufficient to permit the installed cap 206 to be essentially flush with the surface and exposed or otherwise visible to permit easy access to the node after installation.

Figure 20:
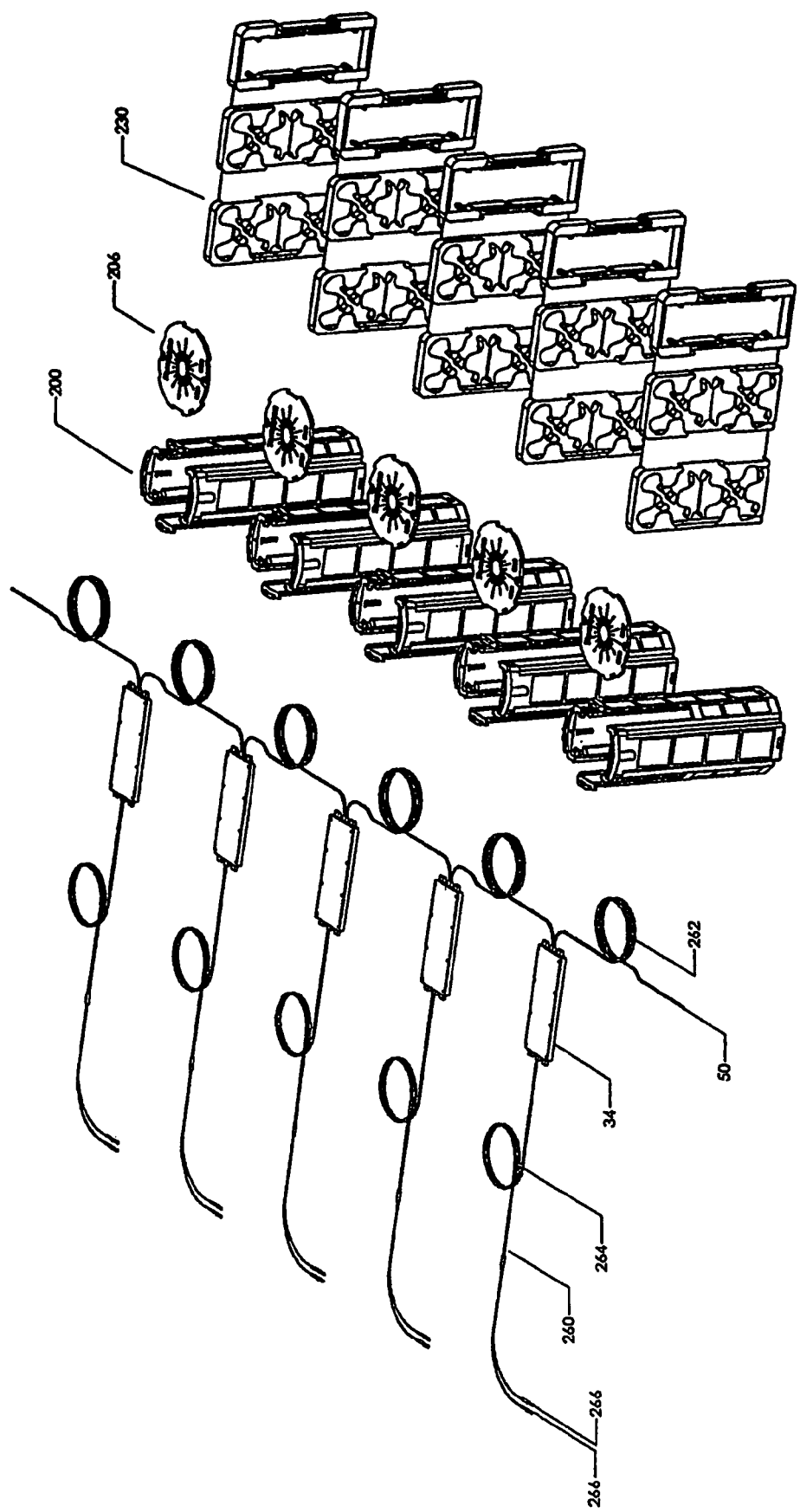
FIG. 20 is a schematic view of a pre-assembled cable network according to the present invention.

A still further aspect of the invention is shown in FIG. 20, comprising a pre-assembled cable network system for installation within a surface by way of surface-inlay method. In this aspect, a cable network system is pre-assembled and tested at a remote location such as a factory that assembles and tests such systems en masse. This provides economies of scale and at least potentially more precise assembly and testing of the system than would be possible on-site. The pre-assembled system comprises a cable trunk line 50, with a plurality of branch lines 260 extending from the trunk line at intervals which may be regular or based on a predetermined network requirement. Each junction point between trunk and branch lines comprises a cable node and is formed with a cable junction box 34 of the type described above. Cable loops 262 are provided in the trunk line 50 between the nodes, with the cable loops comprising a predetermined length generally corresponding with the expected internode distance. For most urban or suburban settings it is expected that the internode distance represents a typical building spacing of about 50-100 feet. However, it will be clear that any selected spacing may be provided. It is also expected that a surplus of cable would be provided between nodes and for each branch line. A second cable loop 264 is provided within each branch line. Each branch line 260 terminates at its free end in a conventional cable connector 266 for joining with a cable within the building or residence. A plurality of inner housings 230 are provided to receive the junction boxes 34, with the junction boxes being pre-installed within these housings 230. The system is thus delivered to an installer with all nodes being pre-installed within housings 230 and all cable including cable loops 262 and 264 being provided in a fashion which permits unrolling without tangling.

Installation of such a pre-assembled system in essentially the same manner as described above for the embodiment of FIGS. 12-19. In particular, the node locations are determined at the installation side and node holes are then drilled or dug into the surface at these locations. The node protectors 200 are then installed within these openings. Trunk cable channels are then cut between the nodes (slicing through the slots 241 as described above) and branch channels are also cut between the residences or buildings to be connected and the corresponding nodes. A node may also be installed in anticipation of a connection being made to a building, in which case the loop 264 is simply stored within the node for future use. The cable network including the pre-installed junction boxes is then unwound and the cable and housings 230 are installed by surface inlay. The housings 200 are then capped with lids 206 and the surface restored.

The present invention has been described, in part, by way of a detailed description of embodiments thereof. The invention is not limited in its scope to the detailed description provided in this specification. Rather, the full scope of the invention is defined by the entirety of this specification including the claims and it will be understood that the scope of these claims extends beyond the detailed description herein and covers numerous variations and departures from the described embodiments.

The invention claimed is:

1. A housing for retaining a cable junction box and a cable loop independently of said cable junction box for use in a fibre optic network, comprising at least two substantially flat, open-topped compartments joined together for folding said compartments together like a book with said open tops covered when closed, each of said compartments comprising a floor and sidewalls defining an interior space, said sidewalls including openings for passing cable between said interior spaces, a first of said compartments including a space to removably install a cable junction box and a second of said compartments being arranged to install at least one loop of cable within said interior space, said housing further including at least one entry and exit port to sealingly receive fibre optic cable within the interior thereof, said housing being configured to enclose said junction box and said cable loop independently from each other when said housing is closed.

2. A housing as defined in claim 1, further including at least one hub protruding from the floor of said second compartment into the interior thereof for receiving a loop of cable within the interior space of said second panel.

3. A housing as defined in claim 1, wherein said cable entry and exit ports comprise at least one slot within said sidewall opening to the exposed upper surface of said sidewall when said housing is open, for inserting a length of uncut cable into the interior of said housing.

4. A housing as defined in claim 1, further comprising a third of said compartments, joined to said second compartment said first, second and third compartments being substantially identical in plan configuration, said first, second and third compartments being arranged for folding together in a book-like fashion, said third compartment comprising additional cable receiving means for receiving at least one additional loop of cable within the interior space thereof.

5. A housing as defined in claim 4, wherein said compartments are joined together by first and second flexible webs which form exterior opposed sidewalls of said housing when closed.

6. A housing as defined in claim 1, further comprising a hollow outer casing having an open top, an upper rim and at least two opposed slots opening to said rim for receiving cable into the interior of said casing and a removable lid for capping said open top, said slots being arranged for passing a channel-cutting tool through said slots in a single motion while cutting a cable channel through said surface, said outer casing being shaped to receive said housing within the interior thereof 7. A housing as defined in claim 6, wherein said outer casing is substantially cylindrical for insertion within a cylindrical hole.

8. A housing as defined in claim 6, wherein said outer casing includes a plurality of opposed substantially flat inner faces for retaining said inner housing.

* * * * *